(12) United States Patent
Asahi et al.

(10) Patent No.: US 8,823,817 B2
(45) Date of Patent: Sep. 2, 2014

(54) CAMERA MANAGEMENT DEVICE AND NETWORK CAMERA SYSTEM

(75) Inventors: Takeshi Asahi, Tokyo (JP); Masuo Oku, Kamakura (JP); Nagamasa Mizushima, Yokohama (JP); Nobuhiro Yokoi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 325 days.

(21) Appl. No.: 13/204,019

(22) Filed: Aug. 5, 2011

(65) Prior Publication Data

US 2012/0069202 A1 Mar. 22, 2012

(30) Foreign Application Priority Data

Sep. 17, 2010 (JP) ................................. 2010-209649

(51) Int. Cl.
*H04N 5/232* (2006.01)

(52) U.S. Cl.
USPC ................ 348/211.6; 348/211.99; 348/211.1; 348/211.5

(58) Field of Classification Search
USPC .................... 348/211.99, 211.1, 211.5, 211.6
See application file for complete search history.

(56) References Cited

U.S. PATENT DOCUMENTS

| 5,969,755 | A * | 10/1999 | Courtney ..................... 348/143 |
| 6,670,984 | B1 * | 12/2003 | Tanaka et al. ................. 348/159 |
| 7,355,627 | B2 * | 4/2008 | Yamazaki et al. ............ 348/143 |
| 2005/0200714 | A1 * | 9/2005 | Marchese ................. 348/211.3 |

FOREIGN PATENT DOCUMENTS

| JP | 2001-246161 A | 9/2001 |
| JP | 2003-179910 A | 6/2003 |

* cited by examiner

*Primary Examiner* — Anthony J Daniels
(74) *Attorney, Agent, or Firm* — Volpe and Koenig, P.C.

(57) ABSTRACT

The present invention is based upon a camera management device coupled to a network camera via a network and the camera management device is provided with an image receiving unit that receives image data projected by the network camera and including control information for controlling the network camera from the network camera, a control information extracting unit that extracts the control information from the image data received by the image receiving unit and a control transmitting unit that transmits a control command according to the control information to the network camera via the network.

5 Claims, 15 Drawing Sheets

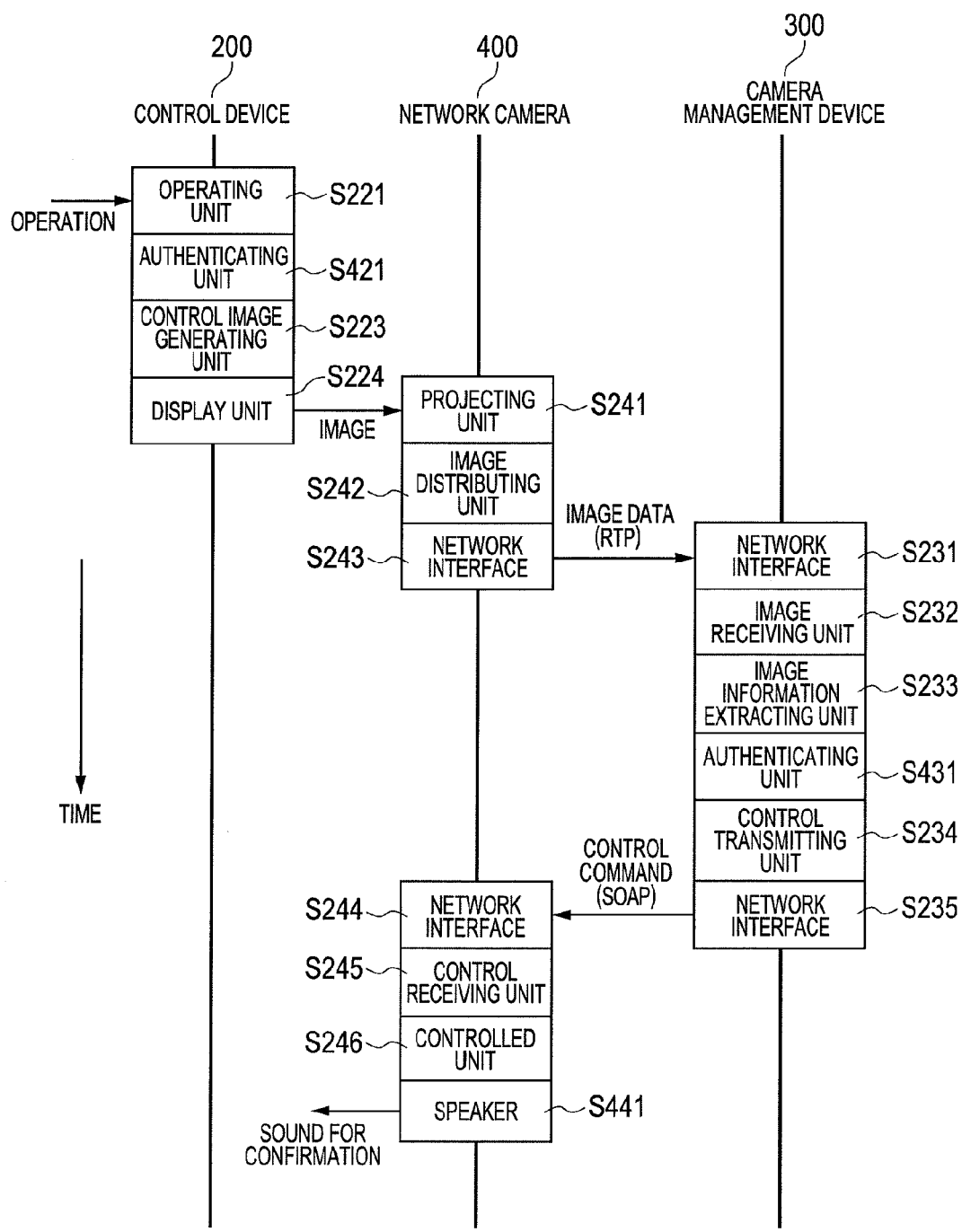

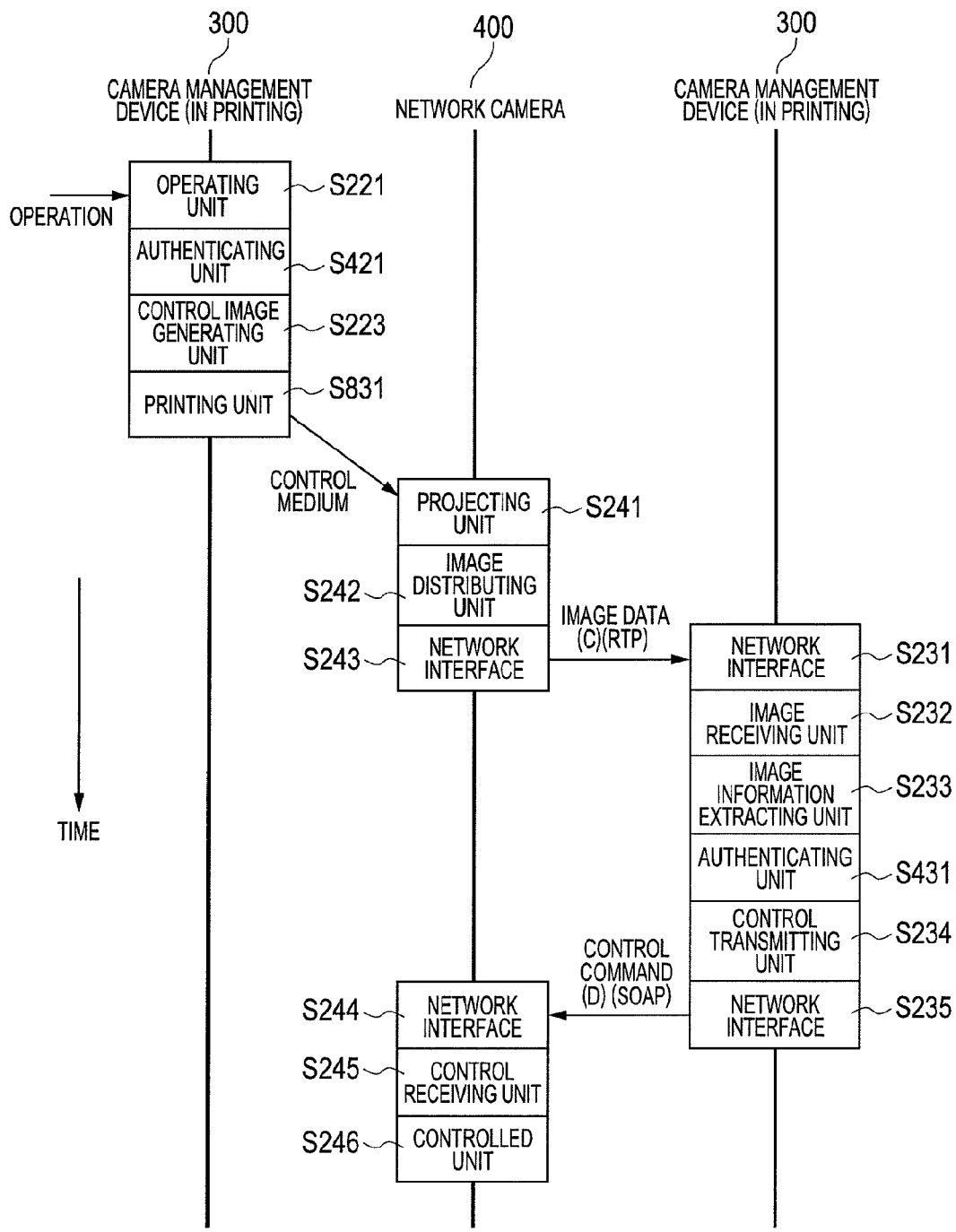

FIG. 13A
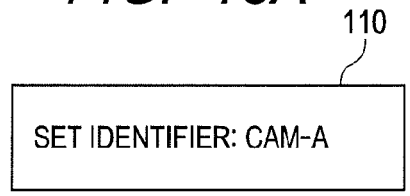
FIG. 13B
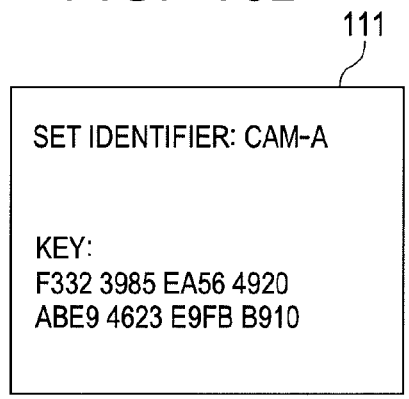
FIG. 13C
```
<SOAP-ENV:Envelope xmlns:SOAP-ENV="http://schemas.xmlsoap.org/soap/envelope/">
 <SOAP-ENV:Body>
  <SetDeviceName xmlns="http://mydevice.org/">
   <Name>CAM-A</Name>
  </SetDeviceName>
 </SOAP-ENV:Body>
</SOAP-ENV:Envelope>
```

CAMERA MANAGEMENT DEVICE AND NETWORK CAMERA SYSTEM

CLAIM OF PRIORITY

The present application claims priority from Japanese application serial no. JP2010-209649, filed on Sep. 17, 2010, the content of which is hereby incorporated by reference into this application.

FIELD OF THE INVENTION

The present invention relates to a network camera management device, concretely relates to the network camera management device that can control a network camera based upon an image projected by the network camera.

BACKGROUND OF THE INVENTION

Generally, as a monitoring camera is utilized for a long term since it is installed, it is required that its maintenance work is continued to be easily executed even if a person in charge of management is changed. Heretofore, network cameras coupled to a network and a camera management device that detects the network cameras on the network and can set, control the detected cameras and instruct to display an image are disclosed.

For example, the camera management device can set a network address and an identifier of the network camera. The camera management device can discriminate the network camera detected on the network by its identifier. Further, the camera management device can also control orientation in which the network camera projects an image.

When multiple network cameras are installed and are managed, it is difficult to judge a location projected by a certain camera out of plural images transmitted from the network cameras if no special clue is given. Then, to recognize the location the image of which is projected, for example, it is required to store an installation location of the network camera and an identifier of the network camera in a state in which they are correlated. In this case, it is required to continuously maintain the correlation and to succeed the correlation when a person in charge of management is changed.

In the meantime, in JP-A No. 2003-179910, an installation location of a camera can be recognized based upon an image from the camera to which an identifier of the installation location as an identifier of the camera is granted by synthesizing the image projected by the monitoring camera and the identifier of the camera using a character synthesizer to enable identifying the installation location of the monitoring camera. Further, as technique for directing by gesture toward a camera, technique for operating a video game console by gesture recognition based upon an image projected by a CCD camera without using an input unit such as a keypad is disclosed in JP-A No. 2001-246161.

Heretofore, when a network camera is controlled, a camera management device is required. Further, to control a specific network camera, the network camera is required to be identified on the camera management device.

For example, when multiple network cameras installed in various locations are managed, a person in charge of management visits an installation location of the individual network camera for maintenance work. However, even if the network camera located in front of the person in charge of management is to be controlled, it is required that the person waves his/her hand toward the camera because the network camera is required to be identified on the camera management device, verifies an image on which he/she himself/herself waves the hand out of multiple images projected on the camera management device and identifies which network camera on the camera management device the network camera in front is equivalent to.

Further, when the camera management device and the network camera are located in separate locations and it is difficult to carry the camera management device, it is difficult to identify the object network camera on the camera management device because the person in charge of management cannot verify the images on the camera management device even if the person waves the hand toward the object network camera as described above.

Further, for the network camera to recognize gesture such as waving a hand by the person in charge of management and to control itself, it is required that the network camera is provided with a gesture recognition function and a problem occurs that a cost of the network camera is increased.

SUMMARY OF THE INVENTION

Then, the present invention is made in view of the above-mentioned problems and its main object is to provide a camera management device that can control a network camera based upon an image projected by the network camera, a network camera system, a network camera controlling method and a network equipment controlling method.

To solve the problems and to achieve the object, the camera management device according to the present invention is based upon a camera management device coupled to network cameras via a network and has a characteristic that the camera management device according to the present invention is provided with an image receiving unit that receives image data projected by the network camera and including control information for controlling the network camera from the network camera, a control information extracting unit that extracts the control information from the image data received by the image receiving unit and a control transmitting unit that transmits a control command according to the control information to the network camera via the network.

Further, the camera management device according to the present invention is based upon a camera management device coupled to network cameras via a network and has a characteristic that the camera management device according to the present invention is provided with an image receiving unit that receives, from the network camera, image data projected by the network camera and including control information for controlling a device for displaying image object information which is the information of an object of projection and identification information for identifying the device, a control information extracting unit that extracts the control information and the identification information from the image data received by the image receiving unit and a control transmitting unit that transmits a control command according to the control information to the device identified based upon the identification information, via the network.

In addition, the network camera system according to the present invention is based upon a network camera system in which a network camera and a camera management device that manages the network camera are coupled via a network and has a characteristic that the camera management device is provided with an image receiving unit that receives image data projected by the network camera and including control information for controlling the network camera from the network camera, a control information extracting unit that extracts the control information from the image data received by the image receiving unit and a control transmitting unit that transmits a control command according to the control information to the network camera via the network, and the network camera is provided with a projecting unit that projects a device for displaying image object information which includes the control information and which is the information of an object of projection, an image distributing unit that transmits the image object information projected by the projecting unit to the camera management device as the image data, a control receiving unit that receives the control command from the camera management device and a controlled unit that controls the network camera according to the control command received by the control receiving unit.

According to the present invention, the camera management device that can control the network camera based upon an image projected by the network camera and the network camera system can be provided.

BRIEF DESCRIPTION OF THE DRAWINGS

FIG. 4 shows a process flow of a camera controlling method executed in the network camera system equivalent to the second and fourth embodiments;

FIG. 11 shows a process flow of a camera controlling method executed in the network camera system equivalent to the sixth embodiment;

FIG. 13A shows an example of control information in the above-mentioned embodiments, FIG. 13B shows an example of image object information in the embodiments, FIG. 13C shows an example of a control command in the embodiments.

DETAILED DESCRIPTION OF THE PREFERRED EMBODIMENTS

First Embodiment

———System Configuration———

Figure 1:
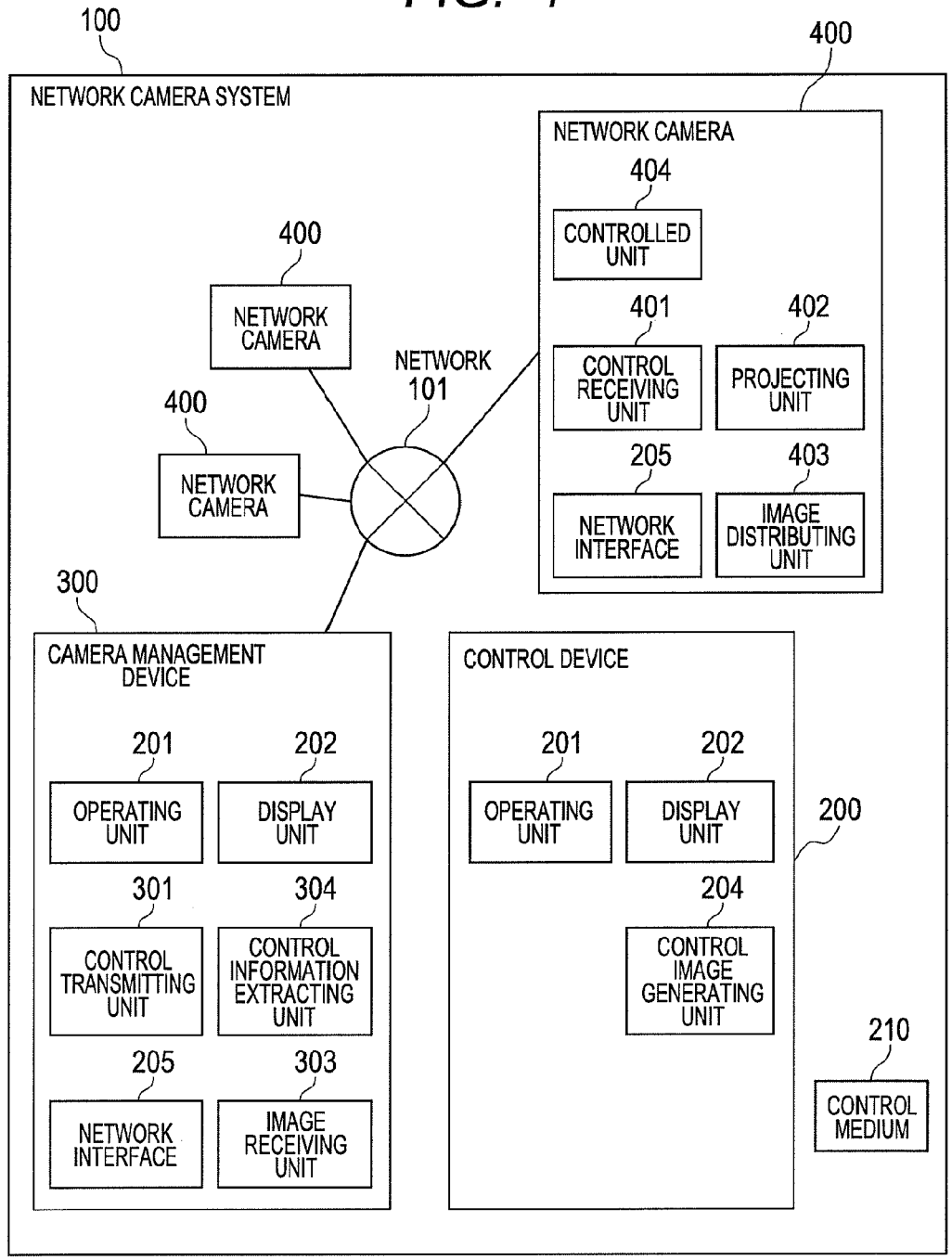
FIG. 1 is a block diagram showing a network camera system equivalent to a first embodiment.

Referring to the drawings, a first embodiment of a camera management system and a network camera system according to the present invention will be described in detail below.

FIG. 1 is a block diagram showing a network camera system 100 in this embodiment. The network camera system 100 shown in FIG. 1 includes a network camera 400 that transmits image data 112 which is controlled according to a control command 113 and the projected image object information 111 of which is projected data to a camera management device 300, the camera management device 300 that extracts control information 110 from the image data 112 received from the network camera 400 and controls the network camera 400 according to a control command 113 corresponding to the control information 110 and a network 101 that couples them. Concrete examples of the control information 110, the image object information 111, the image data 112 and the control command 113 will be described later.

Further, the network camera system 100 displays the image object information 111 including the control information 110 and includes a control device 200 and a control medium 210 respectively projected by the network camera 400. For example, the control device 200 is provided with a function for displaying the image object information 111 including the control information 110 and is equipment (for example, electronic equipment such as iPad (a registered trademark)) projected by the network camera 400. In addition, the control medium 210 such as paper on which the image object information 111 including the control information 110 is printed is a medium that displays the image object information 111 including the control information 110 and that is projected by the network camera 400.

The network camera system 100 may also include plural network cameras 400. Further, the control medium 210 has only to be made of printable material such as plastic and metal in addition to paper. Next, the camera management device 300 will be described.

———Camera Management Device 300———

The camera management device 300 is an information processor such as a general purpose personal computer and is provided with an operating unit 201, a display unit 202, a control transmitting unit 301, an image receiving unit 303, a control information extracting unit 304 and a network interface 205.

The operating unit 201 is a user interface (for example, an input unit such as a keyboard and a mouse) that accepts the selection of the controlled network camera 400 from a user and accepts the input of the control information 110 to the network camera 400.

The display unit 202 is a monitor that displays the image data 112 received from the network camera 400 and decoded by the image receiving unit 303.

The control transmitting unit 301 is provided with a function for transmitting the control command 113 to a control receiving unit 401 of the network camera 400 via the network 101. The function for transmitting the control command 113 is realized by a simple object access protocol (SOAP) client for example. A control command 113 can control various setting and operation for the network camera 400 such as setting an identifier, setting a network address and specifying the orientation of the camera.

The image receiving unit 303 is provided with a function for receiving the image data 112 from the image distributing unit 403 of the network camera 400 via the network 101 and a function for decoding the image data 112. The function for receiving the image data 112 is realized by a real-time transport protocol (RTP) client for example. The function for decoding the image data 112 is realized by a decoder according to H.264 for example.

The control information extracting unit 304 is provided with a function for extracting the control information 110 from the image data 112 received by the image receiving unit 303. According to the function for extracting the control information 110 from the image data 112, the control information 110 is extracted from the image data 112 using image recognition technique. The image recognition technique is technique for extracting information from an image and examples include character recognition technique used in the existing optical character reader, technique for reading a two-dimensional code such as PDF 417 (a registered trademark) and a QR code (a registered trademark), gesture recognition technique for recognizing the body gesture and the hand gesture of a person and image recognition technique for recognizing a direction shown by an arrow. The control information 110 includes an instruction related to the network camera 400 to be controlled, for example, setting its identifier, setting its network address and setting a projected direction.

The network interface 205 is an interface coupled to the network 101 for communicating with another network interface 205 and is an Ethernet (a registered trademark) card for example. Next, the network camera 400 will be described.

———Network Camera 400———

The network camera 400 is provided with the control receiving unit 401 that receives the control command 113 and controls the network camera 400, a projecting unit 402 that projects the image object information 111, a network camera interface 205 coupled to the network 101 and an image distributing unit 403 that transmits the image data 112 of the image object information 111 projected by the projecting unit 402. These units may also have configuration heretofore known with which the network camera 400 is provided.

The control receiving unit 401 is provided with a function for receiving the control command 113 from the control transmitting unit 301 of the camera management device 300 via the network 101. The function for receiving the control command 113 is realized by a SOAP server for example. The control receiving unit 401 is provided with a function for interpreting the control command 113 and for controlling the controlled unit 404, the projecting unit 402, the network interface 205 and the image distributing unit 403 according to the contents of the control command 113.

The projecting unit 402 is provided with a function for outputting a projected camera image 116 to the image distributing unit 403. The projecting unit 402 is a charge coupled device (CCD) image sensor for example. The projecting unit 402 may also be provided with a function for adjusting the image quality such as the luminance of an output camera image 116 and a pan tilt zoom (PTZ) function for adjusting projected orientation and a zoom. The image quality adjusting function and the PTZ function are controlled according to a control command 113 received from the camera management device 300.

The image distributing unit 403 is provided with a function for encoding a camera image 116 projected by the projecting unit 402 as image data 112 and a function for transmitting the image data 112 to the image receiving unit 303 of the camera management device 300 via the network 101. The function for transmitting image data 112 is realized by an RTP server for example. The function for encoding a camera image 116 is realized by an encoder according to H.264 for example. The RTP server and the encoder according to H.264 are controlled according to a control command 113 received from the camera management device 300.

The controlled unit 404 is provided with an identifier storing function for setting and reading an identifier of the network camera 400. Further, the controlled unit 404 is provided with a setting information storing function for storing and reading the setting information of the functions with which the network camera 400 is provided. The identifier storing function and the setting information storing function can be controlled according to a control command 301 received from the camera management device 300. For example, the identifier of the network camera 400 can be set to an identifier specified in a control command 301 by the camera management device 300. Next, the control device 200 will be described.

———Control Device 200———

The control device 200 is provided with an operating unit 201, a display unit 202, a control information generating unit 203, a control image generating unit 204, a network interface 205 and an authenticating unit 206.

The operating unit 201 is a user interface for inputting the control information 110 included in the image object information 111. For example, the operating unit 201 is a liquid crystal display monitor provided with a touch panel that functions as a graphical user interface for inputting the control information 110 on the touch panel on the liquid crystal display monitor.

The display unit 202 is a monitor that displays the image object information 111 including the control information 110. For example, the display unit 202 is the liquid crystal display monitor provided with the touch panel shared with the operating unit 201.

The control image generating unit 204 generates the image object information 111 based upon the control information 110 input on the operating unit 201. The image object information 111 generated by input on the operating unit 201 has only to be image object information 111 recognizable by image recognition technique with which the control information extracting unit 304 of the camera management device 300 is provided. For example, the control image generating unit 204 is provided with an image generating function for representing the control information 110 by a black letter on a white background and the image object information 111 is an image that represents the control information 110 by the black letter on the white background. For another example, the control image generating unit 204 is provided with a function for generating a two-dimensional code including the control information 110 and the image object information 111 is the two-dimensional code including the control information 110. Next, various information handled by the network camera system 100 will be described.

FIGS. 13A to 13D show examples of the control information 110, the image object information 111, the control command 113 and the camera image 116 in this embodiment. First, the control information 110 will be described.

———Control Information 110———

The control information 110 is information showing contents of control over the network camera 400 which is an object of control. Control information 110 shown in FIG. 13A is an example when an identifier of the network camera 400 is set to CAM-A.

———Image Object Information 111———

The image object information 111 is a character and a two-dimensional code respectively including the contents of the control information 110 displayed by the control device 200 and the control medium 210. FIG. 13B shows an example of the image object information 111. In this example, as image object information 111, the setting of an identifier of CAM-A as the control information 110 and a key 115 (will be described in a second embodiment) are displayed.

For another example, the image object information 111 may also be an arrow. In this case, the control information extracting unit 304 recognizes the arrow in the image object information 111 and extracts the control information 110 that the network camera 400 should project an image from a direction shown by the arrow.

———Image Data 112———

The image data 112 is acquired by encoding the information 111 of an object projected by the projecting unit 402 of the network camera 400 according to CODEC algorithm. The CODEC algorithm is H.264 and JPEG for example. The image data 112 is transmitted from the network camera 400 to the camera management device 300 according to RTP.

———Control Command 113———

The control command 113 is information for the camera management device 300 to instruct the network camera 400. For example, the camera management device instructs the network camera 400 to set an identifier on the network of the network camera 400, to set a network address, to set the codec of an image distributed by the image distributing unit 403 and to set a direction projected by the projecting unit 402. The control command 113 is transmitted and received between the camera management device 300 and the network camera 400 according to SOAP. FIG. 13C shows an example of contents of the control command 113. This example shows that SOAP is utilized for a protocol, an action name showing contents of control is "SetDeviceName" and a parameter is "<Name>CAM-A</Name>".

———Camera Image 116———

Figure 13D:
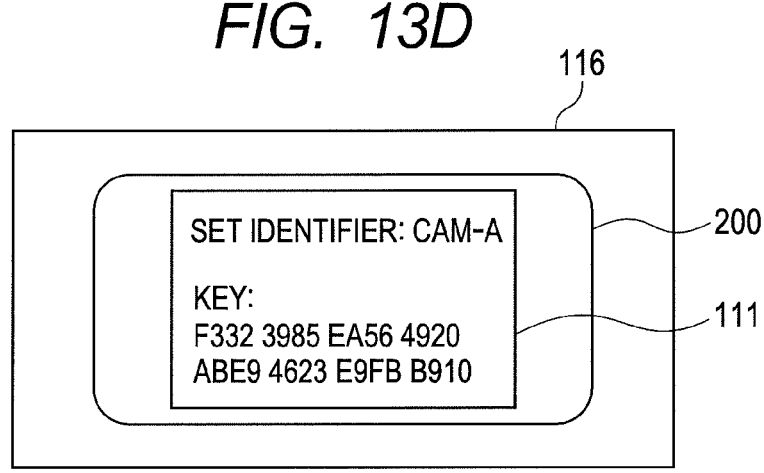
FIG. 13D shows an example of secret information in the embodiments.

The camera image 116 is an image projected by the network camera 400. FIG. 13D shows an example of the camera image 116. In this example, a camera image 116 is an image when the network camera 400 projects the control device 200 that displays the image object information 111. Next, a camera controlling method of the network camera system 100 in this embodiment will be described.

———Process Flow———

Figure 2:
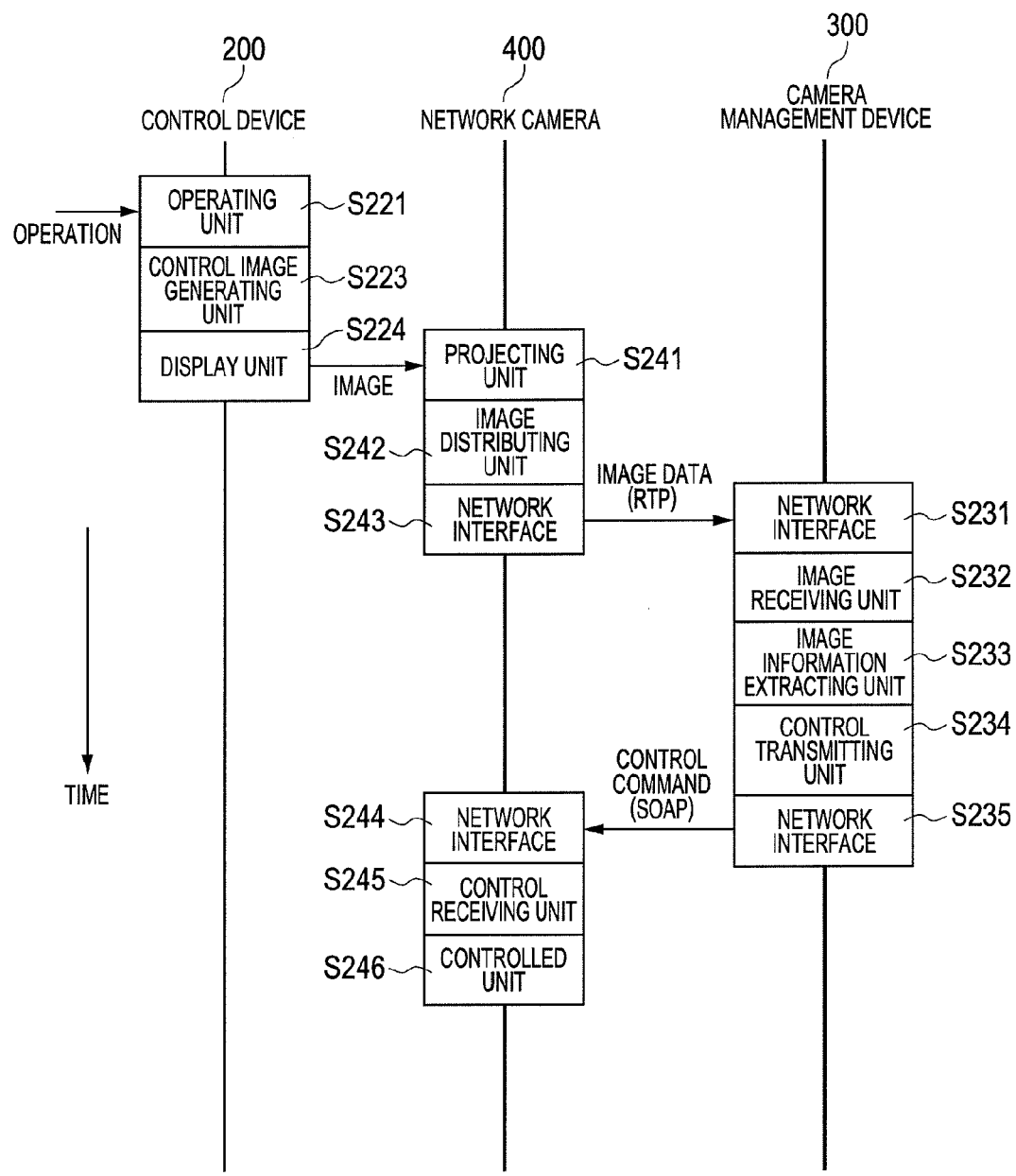
FIG. 2 shows a process flow of a camera controlling method executed in the network camera system equivalent to the first embodiment.

FIG. 2 shows a process flow of the camera controlling method of the network camera system 100 in this embodiment.

In the control device 200, when the operating unit 201 accepts the input of control information 110 (S221), the control image generating unit 204 generates image object information 111 based upon the control information (S223) and the display unit 202 displays the image object information 111 (S224).

In the network camera 400, the projecting unit 402 projects the image object information 111 (S241), the image distributing unit 403 encodes the image object information 111 to image data 112 (S242), and the network interface 205 transmits the image data 112 to the camera management device 300 (S243).

In the camera management device 300, the network interface 205 receives the image data 112 from the network camera 400 (S231), the image receiving unit 303 decodes the image data 112 to a camera image 116 (S232), the image information extracting unit 304 extracts the control information 110 from the camera image 116 (S233), the control transmitting unit 301 generates a control command 113 corresponding to the control information 110 (S234), and the network interface 205 transmits the control command 113 to the network camera 400 which transmits the image data 112 (S235). However, when the image information extracting unit 304 cannot extract the control information 110 from the camera image 116 in the step S233, the process is finished.

In the network cameral 400, the network interface 205 receives the control command 113 from the camera management device 300 (S244), the control receiving unit 401 controls the controlled unit 404, the projecting unit 402, the network interface 205 and the image distributing unit 403 according to the control command 113 (S245), and the controlled unit 404, the projecting unit 402, the network interface 205 and the image distributing unit 403 execute processing according to the control (S246).

As described above, the camera management device 300 that receives the image data 112 can control the network camera 400 that transmits the image data 112 in which the image object information 111 including the control information 110 displayed by the control device 200 is projected by the control command 113 corresponding to the control information 110.

That is, even if the network camera 400 is a conventional type network camera 400, the camera management device 300 can control the network camera 400 based upon the image projected by the network camera 400.

Concretely, the network camera system 100 in this embodiment can set an identifier to the network camera 400 by making the conventional type network camera 400 project the image object information 111 including the control information 110 in which its identifier is set. Or the network camera system 100 in this embodiment can set a network address to the network camera 400 by making the conventional type network camera 400 project the image object information 111 including the control information 110 in which the network address is set.

Or the network camera system 100 in this embodiment can direct the network camera 400 in a direction shown by an arrow by making the conventional type network camera 400 provided with a PTZ function project an image of the arrow. Further, the network camera 400 can be efficiently installed by easily making temporary setting in an installation location of the network camera 400 when the network camera 400 is installed and making exact setting from the camera management device 300 later.

The camera management device 300 may also record a camera image 116 when it receives the camera image 116 including control information 110. Further, the camera management device 300 may also record a camera image 116 without transmitting a control command 113 to the network camera 400 when the camera management device receives the camera image 116 including control information 110, may also display the camera image 116 on the camera display unit 202, and may also transmit a control command 113 to the network camera 400 after operation on the operating unit 201.

———Authentication Measures Against Wrong Setting———

Second Embodiment

A second embodiment is based upon the network camera system 100 in the first embodiment, to reduce possibility in which wrong setting and unfair setting are made to a network camera 400, information generated beforehand based upon secret information 114 shared by a control device 200 and a camera management device 3001 is included in image object information 111 displayed by the control device 200.

———System Configuration———

Figure 3:
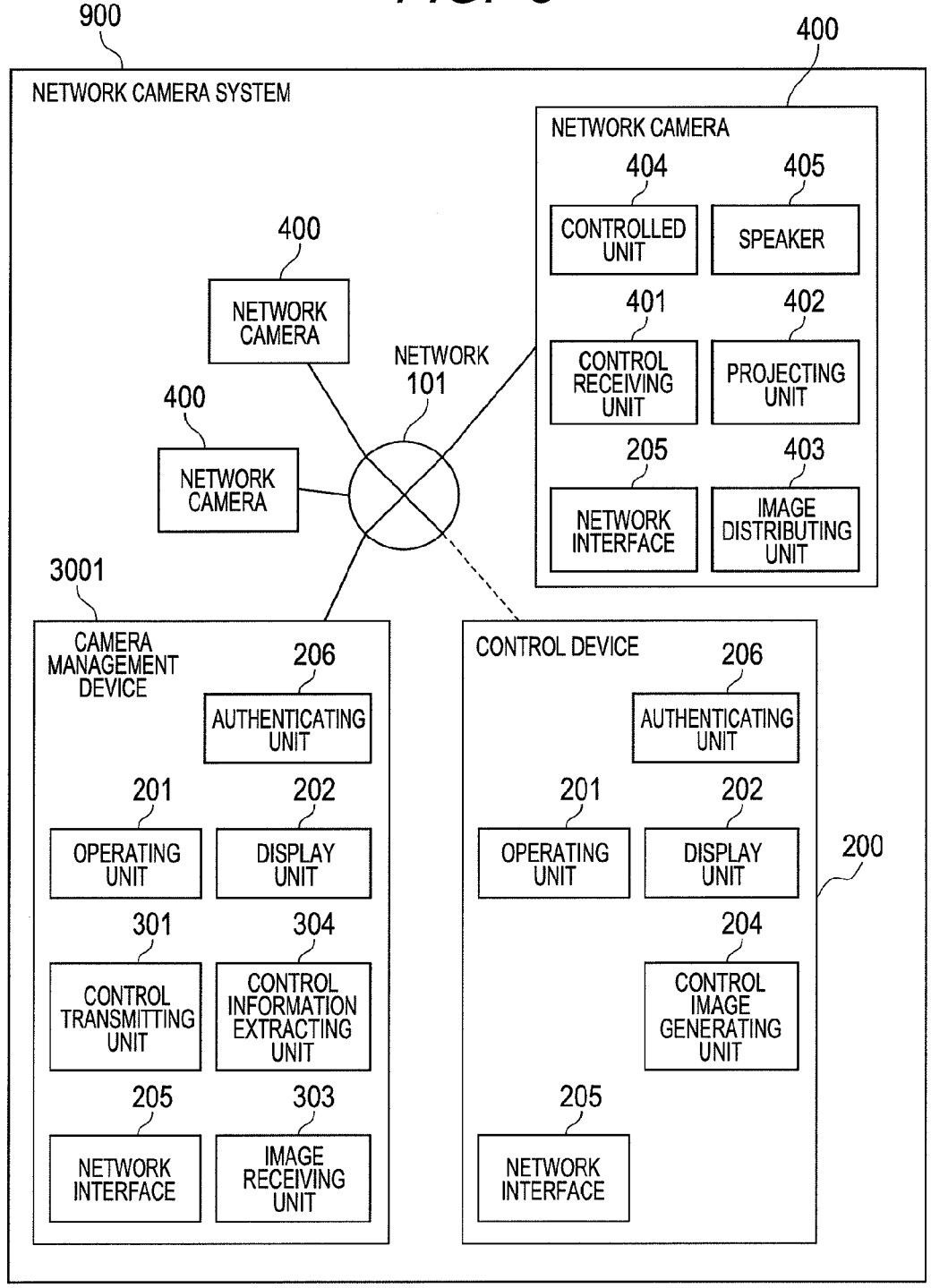
FIG. 3 is a block diagram showing a network camera system equivalent to second and fourth embodiments.

FIG. 3 is a block diagram showing a network camera system 900 in this embodiment. The camera management device 3001 in the network camera system 900 in the second embodiment is different from the camera management device 300 in the network camera system 100 in the first embodiment in that an authenticating unit 206 is further provided in addition to the similar configuration to that of the camera management device 300 in the first embodiment.

In addition, the control device 200 in the second embodiment is different from the control device 200 in the first embodiment in that an authenticating unit 206 and a network interface 205 are further provided. The same reference numeral is allocated to the same component as that in the first embodiment below and the description is omitted.

The authenticating unit 206 is provided with a function for storing the secret information 114 and is provided with one of a function for generating a key 115 based upon the secret information 114 and a function for verifying the key 115 or both.

The authenticating unit 206 includes a central processing unit (CPU), a memory, a program operated in the CPU and a timer clock showing current time for example. The function for storing the secret information 114 is realized by the memory (not shown) for example. The function for generating the key 115 based upon the secret information 114 is realized by an encryption program according to an advanced encryption standard (AES) for example. The function for verifying the key 115 is realized by a decryption program according to AES for example. Next, the secret information 114 will be described.

———Secret Information 114———

Figure 13E:
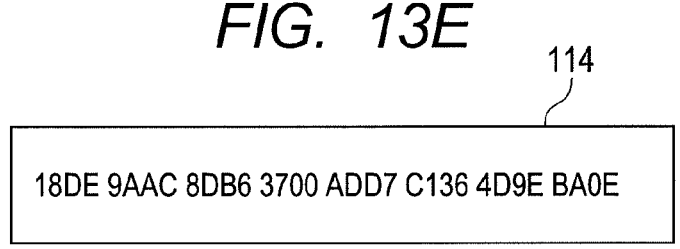
FIG. 13E shows an example of key information in the embodiments.

The secret information 114 is shared by the control device 200 and the camera management device 3001. FIG. 13E shows an example of the secret information 114. The camera management device 3001 determines whether image data 112 includes image information 111 encrypted by the secret information 114 or not when the camera management device receives the image data 112 including control information 110 from the control device 200 and when the camera management device determines that no image information 111 encrypted by the secret information 114 is included, the camera management device does not accept the control information 110. Hereby, the possibility is reduced that wrong setting by the wrong recognition of control information 110 and unfair setting from the control device 200 that does not share the secret information 114 are made. The secret information 114 is a common key of 128 bit length according to AES for example. The following description will be made based upon a common key cryptosystem. However, image data 112 can be encrypted by various methods heretofore known such as a public key cryptosystem. Next, the key 115 will be described.

———Key 115———

Figure 13F:
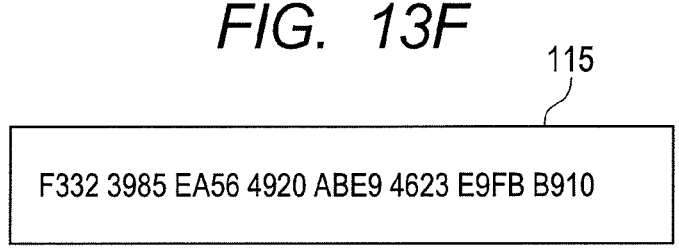
FIG. 13F shows an example of an image from a camera in the embodiments.

The key 115 is information included in the image object information 111 when the control device 200 is projected by the network camera 400 and is information for the camera management device 3001 to judge that the control device 200 is a legal control device 200. FIG. 13F shows an example of the key 115. The key 115 is data of 128 bit length encrypted according to AES for example.

The control device 200 and the camera management device 3001 share the secret information 114 beforehand. For a method of sharing it, the same value is set as the secret information 114 from the control device 200 and an operating unit 201 of the camera management device 3001. Or the control device 200 and the camera management device 3001 are coupled via a network 101, and the secret information 114 may also be shared utilizing a key exchange protocol such as Internet Key Exchange (IKE). Next, a camera controlling method of the network camera system 900 in this embodiment will be described.

———Process Flow———

FIG. 4 shows a process flow of the camera controlling method of the network camera system 900 in this embodiment.

In the camera controlling method in the first embodiment, the control device 200 generates the image object information 111 based upon the control information 110 and transmits the generated image object information to the camera management device 3001. However, in the camera controlling method in the second embodiment, the control device 200 generates the image object information 111 based upon the control information 110 and the key 115 and transmits it to the camera management device 3001.

Further, in the camera controlling method in the first embodiment, the camera management device 3001 extracts the control information 110 from the camera image 116 and transmits the control command 113 corresponding to the control information 110 to the network camera 400 that transmits the camera image. However, in the camera controlling method in the second embodiment, the camera management device 3001 extracts the control information 110 and the key 115 from a camera image 116 and transmits a control command 113 corresponding to the control information 110 to the network camera 400 that transmits the camera image only when the key 115 is verified and is accepted. Hereby, the possibility is reduced that the camera management device 3001 may make wrong setting for the network camera 400 by the wrong recognition of the control information 110 and may make unfair setting for the network camera 400 based upon the control information 110 from the control device 200 that does not share the secret information 114.

Next, a process flow of the second embodiment will be described referring to FIG. 4.

In the control device 200, an operating unit 201 accepts the input of control information 110 (S221), the authenticating unit 206 generates a key 115 based upon secret information 114 (S421), a control image generating unit 204 generates image object information 111 based upon the control information 110 and the key 115 (S223), and a display unit 202 displays the image object information 111 (S224).

In the network camera 400, a projecting unit 402 projects the image object information 111 (S241), an image distributing unit 403 encodes the image object information 111 as image data 112 (S242), and a network interface 205 transmits the image data 112 to the camera management device 3001 (S243).

In the camera management device 3001, a network interface 205 receives the image data 112 from the network cameral 400 (S231), an image receiving unit 303 decodes the image data 112 to a camera image 116 (S232), an image information extracting unit 304 extracts the control information 110 and the key 115 from the camera image 116 (S233), the authenticating unit 206 verifies the key 115 (S431(S431-1)), when the key passes the verification, a control transmitting unit 301 generates a control command 113 corresponding to the control information 110 (S234), and the network interface 205 transmits the control command 113 to the network camera 400 that transmits the image data 112 (S235). When the key does not pass the verification in S431-1, the process is finished.

However, when the image information extracting unit 304 cannot extract the control information 110 and the key 115 from the camera image 116 in the step S233, the process is finished.

In the network camera 400, the network interface 205 receives the control command 113 from the camera management device 3001 (S244), a control receiving unit 401 controls a controlled unit 404, the projecting unit 402, the network interface 205 and the image distributing unit 403 according to the control command 113 (S245), and the controlled unit 404, the projecting unit 402, the network interface 205 and the image distributing unit 403 execute processing according to the control (S246). Next, the processing (the key generation process) in the step S421 will be described.

———Key Generation (S421)———

Figure 5A:
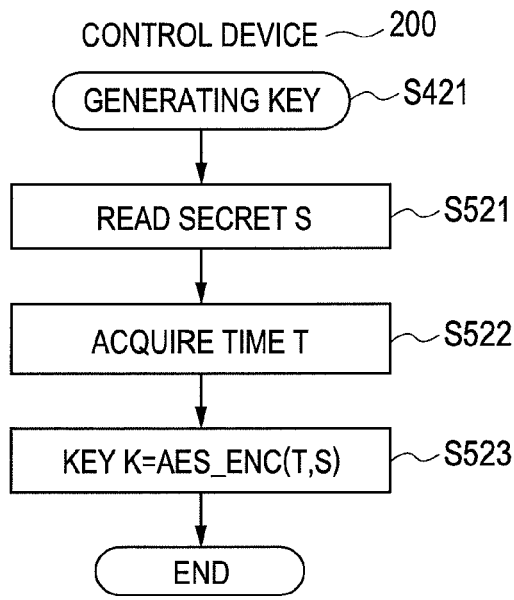
FIG. 5A is a flowchart showing a key generation process by an authenticating unit in a second embodiment and FIG. 5B is a flowchart showing a key verification process by the authenticating unit in the second embodiment.

FIG. 5A is a flowchart showing the key generation process by the authenticating unit 206 in this embodiment.

The control device 200 reads the stored secret information 114 (in this case, the secret S) (S521), reads time T from the timer clock (S522), encrypts according to AES using the time T for a plaintext and using the secret S (114) as a key, and generates its result as the key 115 (S523). Next, the processing (the key verification process) in the step S431-1 will be described.

———Key Verification (S431-1)———

Figure 5B:
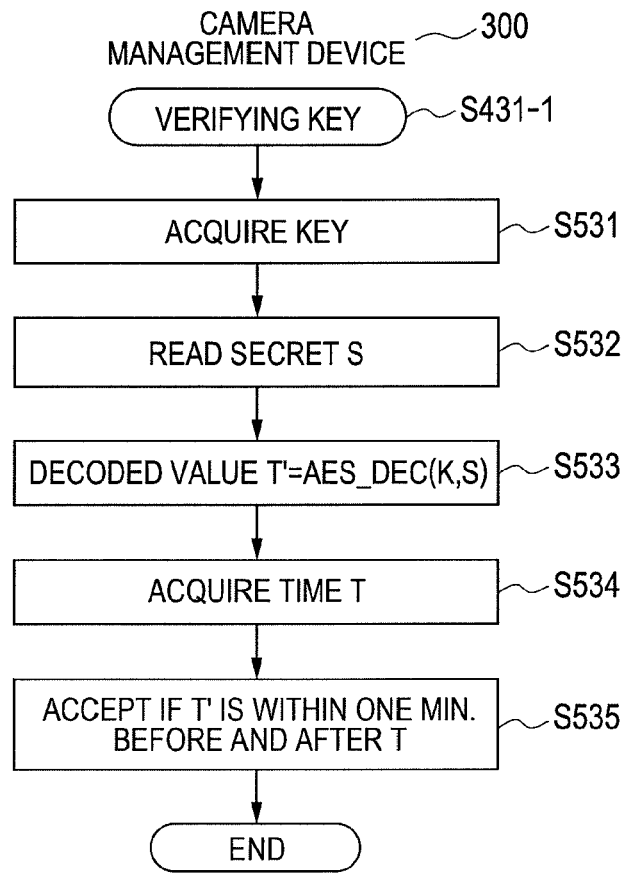

FIG. 5B is a flowchart showing the key verification process by the authenticating unit 206 in this embodiment.

The camera management device 3001 acquires the key 115 extracted from the camera image 116 (S531), reads the stored secret S (114) (S532), decrypts according to AES using the key 115 for a cipher text and using the secret S (114) as a key, acquires the result T' (S533), reads time T from the timer clock (S534), and accepts a result if T' and T meet the fixed condition (S535). When the fixed condition is not met, the result is rejected. The fixed condition means that T' is within one minute before and after T for example. Hereby, if the total of time equivalent to a time lag in the setting of time between clocks of the control device 200 and the camera management device 3001 and time required since the control device 200 generates the key 115 until the camera management device 3001 verifies the key 115 is within one minute for example, the result is accepted.

As described above, the network camera system 900 according to the present invention reduces possibility that the camera management device 3001 may make wrong setting to the network camera 400 by the wrong recognition of the control information 110 and unfair setting to the network camera 400 based upon control information 110 from the control device 200 that does not share the secret information 114.

Third Embodiment

———Control Mode———

A third embodiment is based upon the network camera system 100 in the first embodiment, to prevent a camera management device 3002 from setting to a network camera 400 more than necessary, a control mode is provided to the camera management device 3002 and the camera management device 3002 transmits a control command 113 to the network camera 400 according to control information 110 included in a camera image 116 only when the control mode is on. When the control mode is off, the camera management device 3002 transmits no control command 113 to the network camera 400 according to the control information 110 included in the camera image 116.

———System Configuration———

Figure 6:
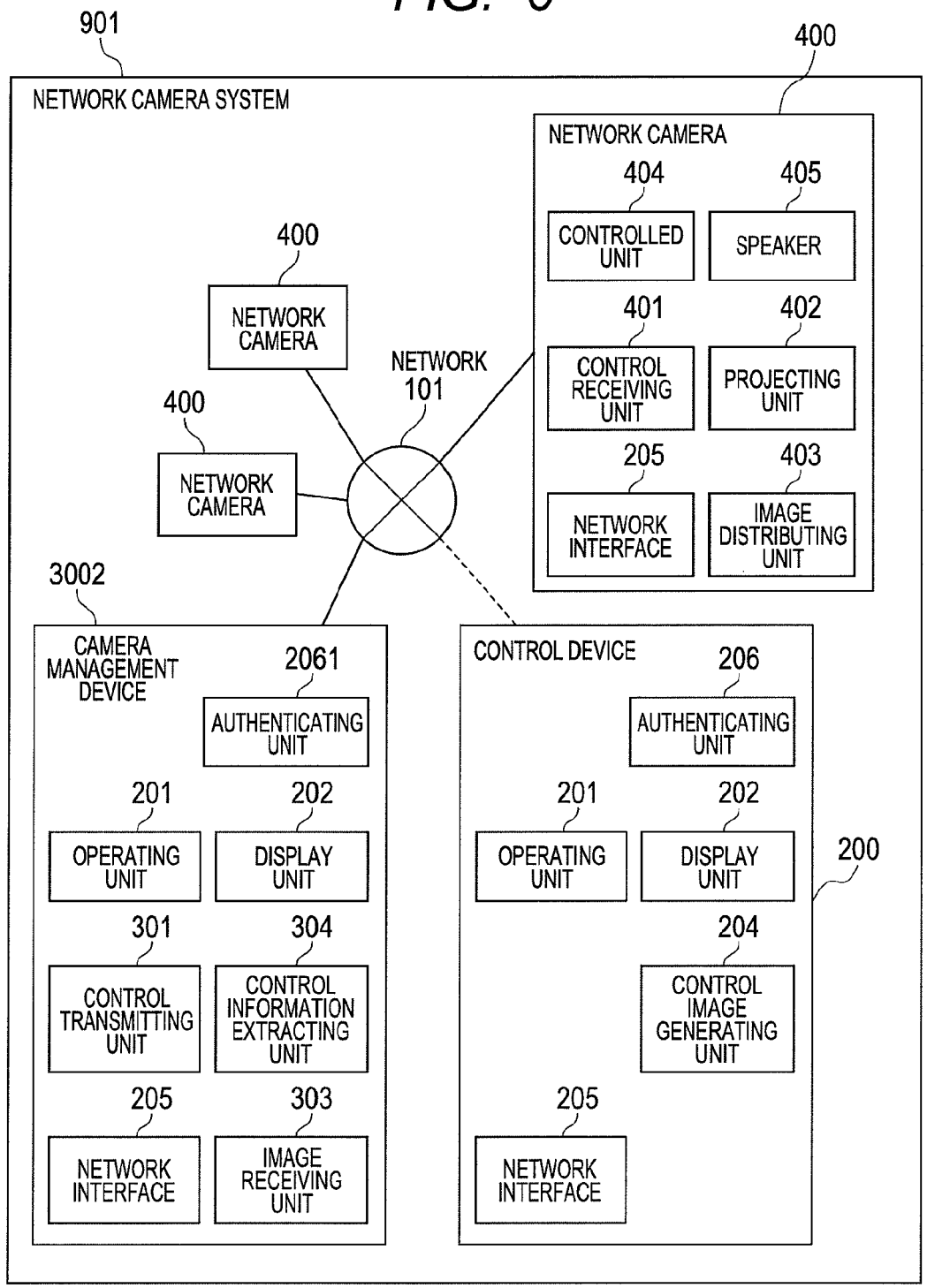
FIG. 6 is a block diagram showing a network camera system equivalent to a third embodiment.

FIG. 6 is a block diagram showing a network camera system 901 in this embodiment. The network camera system 901 in the third embodiment is different from the network camera system 900 including the camera management device 3001 in the second embodiment in that the camera management device 3002 in the third embodiment is provided with an authenticating unit 2061 different from the authenticating unit 206 in the camera management device 3001 in the second embodiment, also differently from the network camera system 100 in the first embodiment. In the following description, the same reference numeral is allocated to the same component as that in the first or second embodiment and the description is omitted.

The authenticating unit 2061 is provided with a function for recording a frequency in which a control command 113 is transmitted to the network camera 400 after the control mode is turned on and for turning off the control mode when the frequency in which the control command 113 is transmitted exceeds a set upper limit frequency.

An operating unit 201 of the camera management device 3002 is provided with a function for accepting the input of the upper limit frequency and the authenticating unit 2061 of the camera management device 3002 stores the upper limit frequency in a memory not shown. Further, the operating unit 201 of the camera management device 3002 is provided with a function for turning on the control mode and the authenticating unit 2061 of the camera management device 3002 stores a state of the control mode in the memory not shown. The state of the control mode is recorded in a memory area of one bit, for example, the control mode is turned off at the time of 0 (zero), and the control mode is turned on at the time of 1.

———Process Flow———

A process flow showing a camera controlling method of the network camera system 901 in this embodiment is the similar to the process flow shown in FIG. 4. However, in the camera controlling method in the first embodiment, the camera management device 300 transmits the control command 113 corresponding to the control information 110 to the network camera 400 that transmits the camera image when the control information 110 can be extracted from the camera image 116. However, in the camera controlling method in the third embodiment, the camera management device 3002 transmits a control command 113 corresponding to control information 110 to the network camera 400 that transmits a camera image by a set upper limit frequency when the control information 110 can be extracted from the camera image 116. Hereby, the camera management device 3002 is prevented from setting the network camera 400 more than necessary.

Next, the process flow in the third embodiment will be described referring to FIG. 4. In a control device 200, an operating unit 201 accepts the input of control information 110 (S221), an authenticating unit 206 generates a key 115 based upon secret information 114 (S421), a control image generating unit 204 generates image object information 111 based upon the control information 110 and the key 115 (S223), and a display unit 202 displays the image object information 111 (S224).

In the network camera 400, a projecting unit 402 projects the image object information 111 (S241), an image distributing unit 403 encodes the image object information 111 to image data 112 (S242), and a network interface 205 transmits the image data 112 to the camera management device 3002 (S243).

In the camera management device 3002, a network interface 205 receives the image data 112 from the network camera 400 (S231), an image receiving unit 303 decodes the image data 112 to a camera image 116 (S232), an image information extracting unit 304 extracts the control information 110 from the camera image 116 (S233), the authenticating unit 2061 verifies whether a frequency in which a control command 113 is transmitted to the network camera 400 exceeds the upper limit frequency or not (S413 (S413-2)), when a result of the verification is accepted, a control transmitting unit 301 generates a control command 113 corresponding to the control information 110 (S234), and the network interface 205 transmits the control command 113 to the network camera 400 that transmits the image data 112 (S235). When a result of the verification in S431-2 is rejected, the process is finished. However, when the image information extracting unit 304 cannot extract the control information 110 from the camera image 116 in the step S233, the process is finished.

In the network camera 400, a network interface 205 receives the control command 113 from the camera management device 3002 (S244), a control receiving unit 401 controls a controlled unit 404, the projecting unit 402, the network interface 205 and the image distributing unit 403 according to the control command 113 (S245), and the controlled unit 404, the projecting unit 402, the network interface 205 and the image distributing unit 403 execute processing according to the control (S246). Next, a control frequency counting process (S413-2) in a step S413 will be described.

——Control Frequency Counting (S431-2)——

Figure 7:
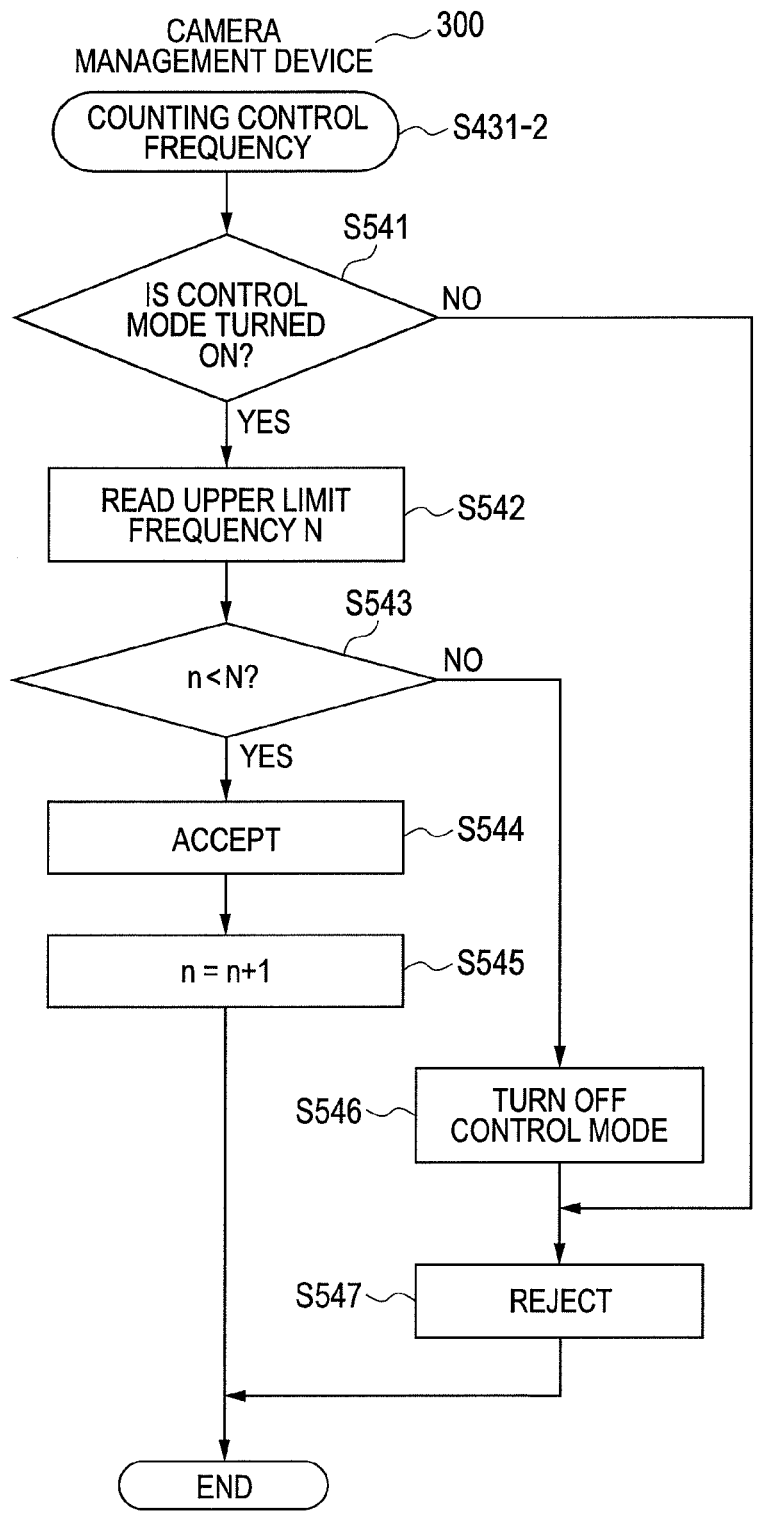
FIG. 7 is a flowchart showing a control frequency counting process by an authenticating unit in the third embodiment.

FIG. 7 is a flowchart showing the control frequency counting process executed by the authenticating unit 2061 in this embodiment. The control frequency counting process for verifying whether or not a frequency in which a control command 113 is transmitted exceeds the upper limit frequency in the step S431-2 will be described below.

First, the camera management device 3002 stores a state of the control mode, a command transmission frequency n and the upper limit frequency N in the memory not shown. The camera management device 3002 resets the command transmission frequency n when the control mode is turned on.

The camera management device 3002 judges whether the control mode is turned on or not (S541) and rejects a result when it is not turned on (S547). When the control mode is on, the upper limit frequency is read (S542), it is judged whether or not the command transmission frequency n is smaller than the upper limit frequency N (S543), when the command transmission frequency is smaller, a result is accepted (S544), and '1' is added to the command transmission frequency n (S545). When the command transmission frequency is not smaller in the step S543, the control mode is turned off (S546) and the result is rejected (S547).

As described above, in the network camera system 901 according to the present invention, the camera management device 3002 can be prevented from setting for the network camera 400 more than necessary.

Fourth Embodiment

——Control Situation Notification——

A fourth embodiment is based upon the network camera system 100 in the first embodiment and it is notified that control over a network camera 400 is completed. Therefore, a network camera 400 is provided with a speaker 405 so as to enable ringing a sound when the control is completed.

——System Configuration——

FIG. 3 is a block diagram showing a network camera system 900 in this embodiment. The network camera system 900 in the fourth embodiment is different from the network camera system 100 including the network camera 400 in the first embodiment in that the network camera 400 in the fourth embodiment is further provided with the speaker 405 in addition to the configuration of the network camera 400 in the first embodiment. The same reference numeral is allocated to the same component as that in the first to third embodiments and the description is omitted.

——Process Flow——

FIG. 4 shows a process flow of a cameral controlling method of the network camera system 900 in this embodiment.

In the camera controlling method in the first embodiment, in the network camera 400, the network interface 205 receives the control command 113 from the camera management device 300 (S244), the control receiving unit 401 controls the controlled unit 404, the projecting unit 402, the network interface 205 and the image distributing unit 403 according to the control command 113 (S245), the controlled unit 404, the projecting unit 402, the network interface 205 and the image distributing unit 403 execute processing according to the control (S246). However, in the camera controlling method in the fourth embodiment, in the network camera 400, a network interface 205 receives a control command 113 from a camera management device 3001 (S244), a control receiving unit 401 controls a controlled unit 404, a projecting unit 402, the network interface 205 and an image distributing unit 403 according to the control command 113 (S245), the controlled unit 404, the projecting unit 402, the network interface 205 and the image distributing unit 403 execute processing according to the control (S246), and the speaker 405 rings a sound for confirmation after the processing is completed (S441). Hereby, it can be known that setting to the network camera 400 is completed.

Next, the process flow in the fourth embodiment will be described referring to FIG. 4. In a control device 200, an operating unit 201 accepts the input of control information 110 (S221), a control image generating unit 204 generates image object information 111 based upon the control information 110 (S223), and a display unit 202 displays the image object information 111 (S224).

In the network camera 400, the projecting unit 402 projects the image object information 111 (S241), the image distributing unit 403 encodes the image object information 111 to image data 112 (S242), and the network interface 205 transmits the image data 112 to the camera management device 3001 (S243).

In the camera management device 3001, a network interface 205 receives the image data 112 from the network camera 400 (S231), an image receiving unit 303 decodes the image data 112 to a camera image 116 (S232), an image information extracting unit 304 extracts the control information 110 from the camera image 116 (S233), a control transmitting unit 301 generates a control command 113 corresponding to the control information 110 (S234), and the network interface 205 transmits the control command 113 to the network camera 400 that transmits the image data 112 (S235). However, when the image information extracting unit 304 cannot extract the control information 110 from the camera image 116 in the step S233, the process is finished.

In the network camera 400, the network interface 205 receives the control command 113 from the camera management device 3001 (S244), the control receiving unit 401 controls the controlled unit 404, the projecting unit 402, the network interface 205 and the image distributing unit 403 according to the control command 113 (S245), the controlled unit 404, the projecting unit 402, the network interface 205 and the image distributing unit 403 execute processing according to the control (S246), and a sound for confirmation is rung from the speaker 405 (S441) after the processing is completed.

As described above, the network camera system 900 according to the present invention can recognize that the setting to the network camera 400 is completed.

Instead of instructing the network camera 400 to ring a sound when it is judged that the processing according to the control command 113 is completed, the camera management device 3001 may also transmit a control command that instructs the speaker 405 to ring a sound to the network camera 400 when the control command 113 is transmitted to the network camera 400.

Further, the network camera 400 not only rings a sound for confirmation after the processing in the step S441 is completed but may also ring a sound when the network camera receives the control command 113 in the step S244 or when the control of each functional block is made in the step S245. In addition, a musical interval or an interval at which the sound is rung may also be changed depending to a situation of control. Hereby, a degree of the progress of the control over the network camera 400 can be known at every step.

Fifth Embodiment

———Control Device Control———

A fifth embodiment is based upon the network camera system 100 in the first embodiment and control over a control device 2001 projected by a network camera 400 is made. Therefore, the control device 2001 is provided with a controlled unit 404, a control transmitting unit 401 and a network interface 205 and a camera management device 300 transmits a control command 113 to the control device 2001.

———System Configuration———

Figure 8:
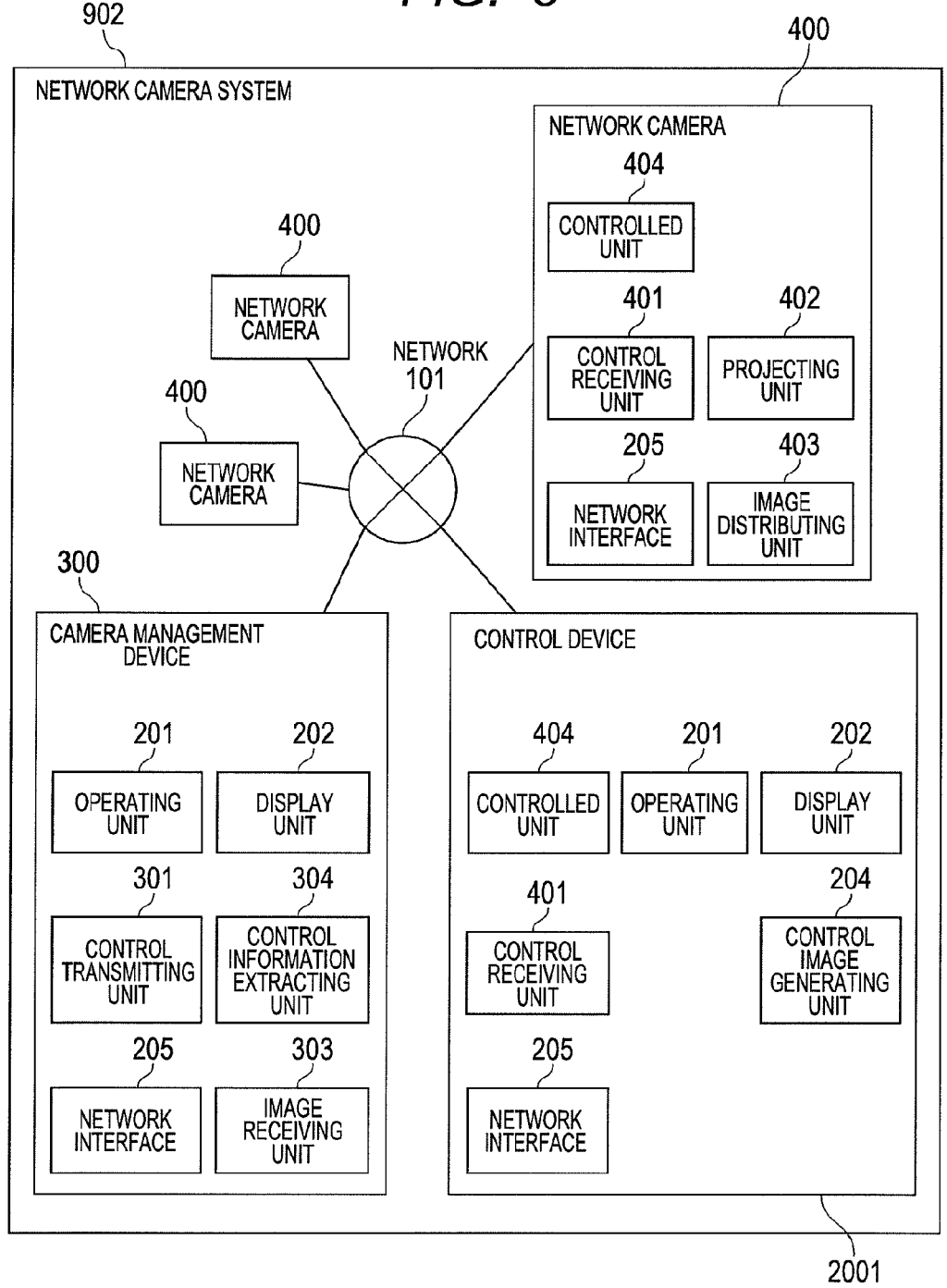
FIG. 8 is a block diagram showing a network camera system equivalent to a fifth embodiment.

FIG. 8 is a block diagram showing the network camera system 902 in this embodiment. The network camera system 902 in the fifth embodiment is different from the network camera system 100 including the control device 200 in the first embodiment in that the control device 2001 in the fifth embodiment is further provided with a controlled unit 404, a control receiving unit 401 and a network interface 205 in addition to the configuration of the control device 200 in the first embodiment. The same reference numeral is allocated to the same component as that in the first to fourth embodiments below and the description is omitted.

The controlled unit 404 is provided with an identifier storing function for setting and reading an identifier of the control device 2001. Further, the controlled unit 404 may also be provided with a setting information storing function for storing and reading the setting information of functions with which the control device 2001 is provided. The identifier storing function and the setting information storing function can be controlled according to the control command 113 received from the camera management device 300. For example, an identifier of the control device 2001 can be set to an identifier specified in the control command 113 by the camera management device 300.

The control receiving unit 401 is provided with a function for receiving the control command 113 from the control transmitting unit 301 of the camera management device 300 via the network 101. A function for transmitting the control command 113 is realized by a SOAP server for example. The control receiving unit 401 is provided with a function for interpreting the control command 301 and controlling the controlled unit 404 and the network interface 205 according to the contents of the control command 301.

———Process Flow———

Figure 9:
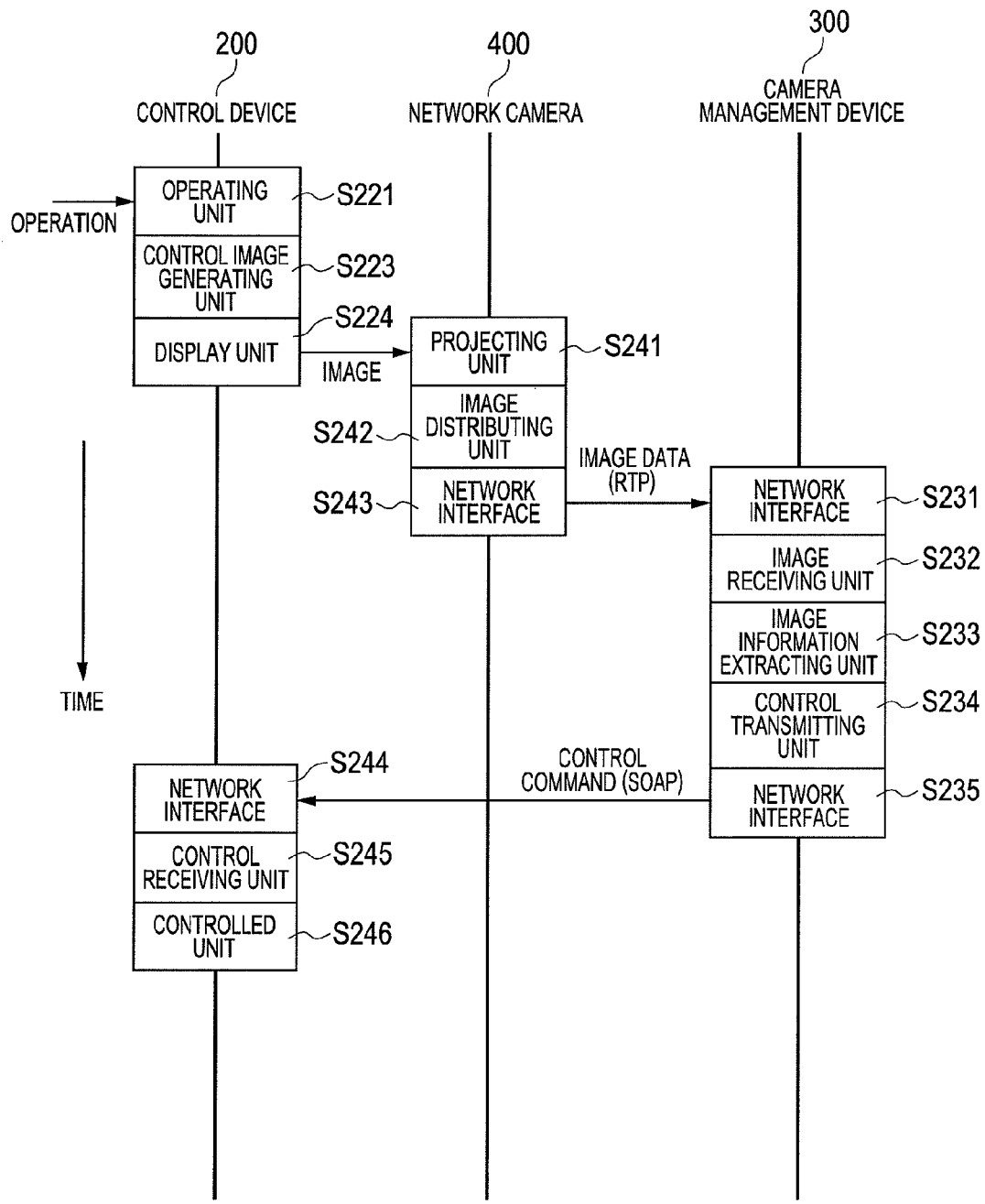
FIG. 9 shows a process flow of a camera controlling method executed in the network camera system equivalent to the fifth embodiment.

FIG. 9 shows a process flow of a camera controlling method of the network camera system 902 in this embodiment. In the first embodiment, the camera management device 300 transmits a control command 113 to the network camera 400. However, in the fifth embodiment, the camera management device 300 transmits a control command 113 to the control device 2001.

In the control device 2001, an operating unit 201 accepts the input of control information 110 (S221), a control image generating unit 204 generates image object information 111 based upon the control information 110 and the identifier of the control device (S223), and a display unit 202 displays the image object information 111 (S224).

In a network camera 400, a projecting unit 402 projects the image object information 111 (S241), an image distributing unit 403 encodes the image object information 111 to image data 112 (S242), and a network interface 205 transmits the image data 112 to the camera management device 300 (S243).

In the camera management device 300, a network interface 205 receives the image data 112 from the network camera 400 (S231), an image receiving unit 303 decodes the image data 112 to a camera image 116 (S232), an image information extracting unit 304 extracts the control information 110 and the identifier of the control device from the camera image 116 (S233), a control transmitting unit 301 generates a control command 113 corresponding to the control information 110 (S234), and the network interface 205 transmits the control command 113 to the control device 2001 which the identifier of the control device shows (S235). However, when the image information extracting unit 304 cannot extract the control information 110 and the identifier of the control device from the camera image 116 in the step S233, the process is finished.

In the control device 2001, the network interface 205 receives the control command 113 from the camera management device 300 (S244), the control receiving unit 401 controls the controlled unit 404 and the network interface 205 according to the control command 113 (S245), and the controlled unit 404 and the network interface 205 execute processing according to the control (S246).

As described above, the camera management device 300 that receives the image data 112 can control the control device 2001 which displays the image object information 111 including the control information 110 and which is projected by the network camera 400 by the control command 113 corresponding to the control information 110.

That is, even if the network camera 400 is a conventional type network camera 400, the camera management device 300 can control the control device 2001 based upon the image projected by the network camera 400. Concretely, the network camera system 902 according to the present invention can set the identifier of the projected control device 2001 by instructing the conventional type network camera 400 to project the image for setting the identifier.

The camera management device 300 may also identify the control device 2001 based upon an image projected by the network camera 400 of the control device 2001 and transmit the control command 113 to the control device 2001. In this case, the camera management device 300 shall be provided with information related to a contour of the control device 2001 and a function for identifying the control device 2001 by image recognition so as to identify the control device 2001.

Sixth Embodiment

———Control Medium———

A sixth embodiment is based upon the network camera system 100 in the first embodiment and a network camera 400 is controlled by a control medium 210 that displays image object information 111 including control information 110 in place of the control device 200.

———System Configuration———

Figure 10:
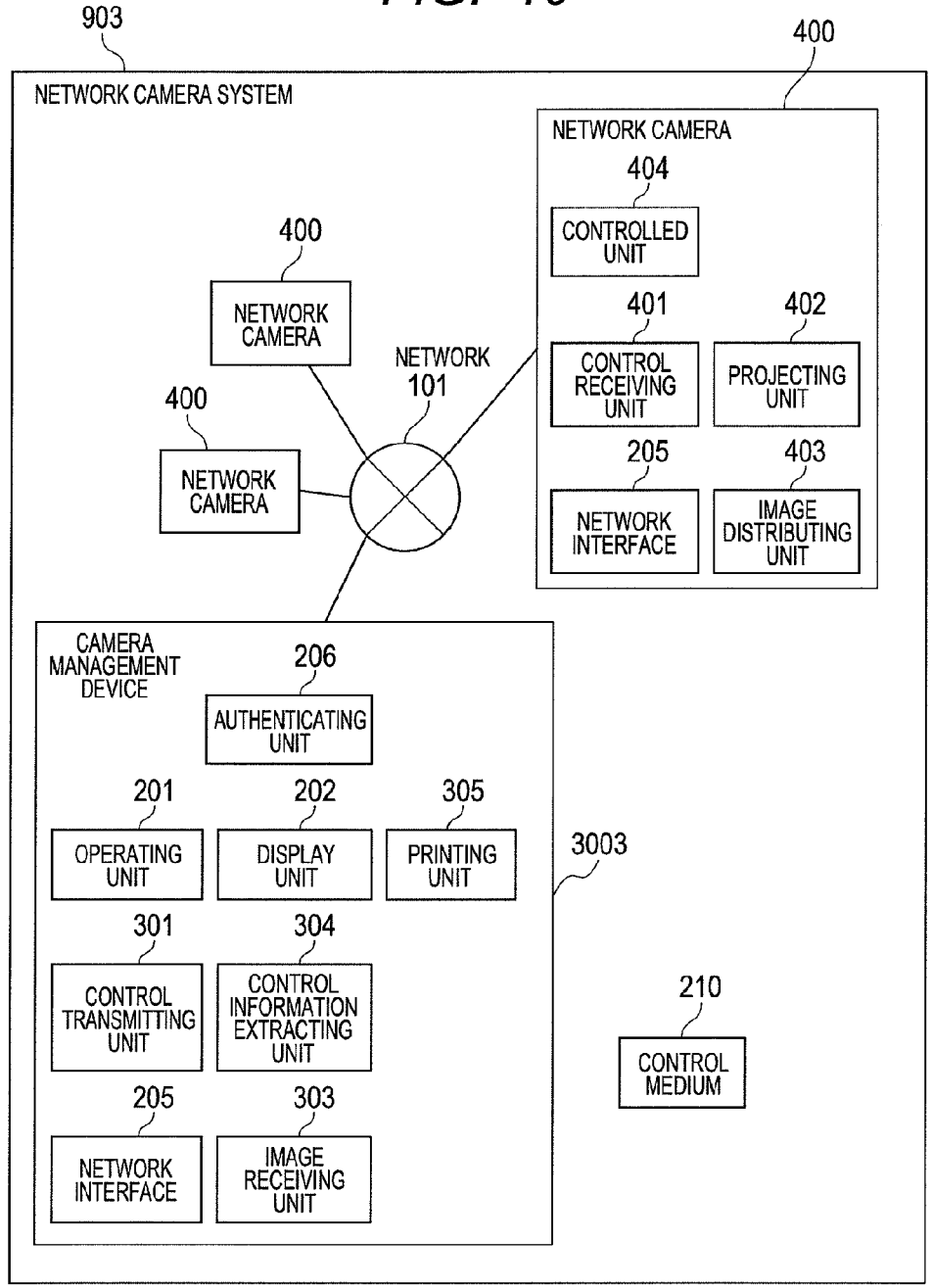
FIG. 10 is a block diagram showing a network camera system equivalent to a sixth embodiment.

FIG. 10 is a block diagram showing a network camera system 903 in this embodiment. The network camera system 903 in the sixth embodiment is different from the network camera system 100 including the camera management device 300 in the first embodiment in that a camera management device 3003 in the sixth embodiment is based upon the camera management device 300 in the first embodiment and further, an authenticating unit 206 and a printing unit 305 are provided. The same reference numeral is allocated to the same component as that in the first to fifth embodiments below and the description is omitted. The network camera system 903 in the sixth embodiment is provided with the control medium 210. However, the control medium 210 shall be printable paper below.

———Process Flow———

FIG. 11 shows a process flow of a camera controlling method of the network camera system 903 in this embodiment.

In the camera management device 3003, an operating unit 201 accepts the input of control information 110 (S221), the authenticating unit 206 generates a key 115 based upon secret information 114 (S421), a control image generating unit 204 generates image object information 111 based upon the control information 110 and the key 115 (S223), and the printing unit 305 prints the image object information 111 on the control medium 210 (S831).

In the network camera 400, a projecting unit 402 projects the image object information 111 on the control medium 210 (S241), an image distributing unit 403 encodes the image object information 111 to image data 112 (S242), and a network interface 205 transmits the image data 112 to the camera management device 3003 (S243).

In the camera management device 3003, a network interface 205 receives the image data 112 from the network camera 400 (S231), an image receiving unit 303 decodes the image data 112 to a camera image 116 (S232), an image information extracting unit 304 extracts the control information 110 and the key 115 from the camera image 116 (S233), the authenticating unit 206 verifies the key 115 (S431(S431-1)), when a result of the verification is accepted, a control transmitting unit 301 generates a control command 113 corresponding to the control information 110 (S234), the network interface 205 transmits the control command 113 to the network camera 400 that transmits the image data 112 (S235). When a result of the verification in S431-1 is rejected, the process is finished and when the image information extracting unit 304 cannot extract the control information 110 and the key 115 from the camera image 116 in the step S233, the process is finished.

In the network cameral 400, the network interface 205 receives the control command 113 from the camera management device 3003 (S244), a control receiving unit 401 controls a controlled unit 404, the projecting unit 402, the network interface 205 and the image distributing unit 403 according to the control command 113 (S245), and the controlled unit 404, the projecting unit 402, the network interface 205 and the image distributing unit 403 execute processing according to the control (S246). Next, the key generating process in the step S421 will be described.

———Key Generation (S421)———

Figure 12A:
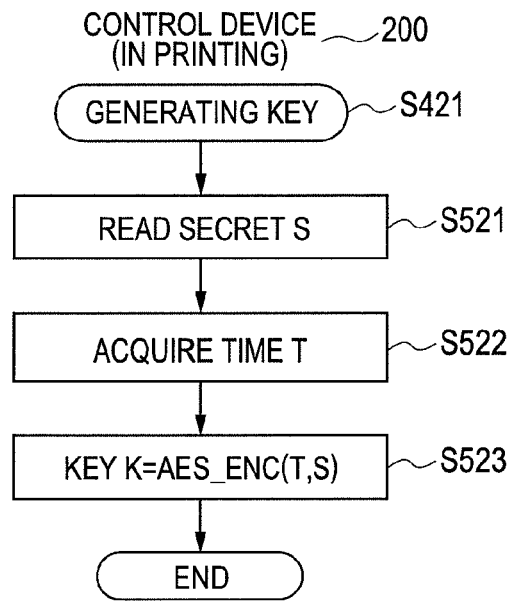
FIG. 12A is a flowchart showing a key generation process by an authenticating unit in the sixth embodiment and FIG. 12B is a flowchart showing a key verification process by the authenticating unit in the sixth embodiment.
Figure 12B:
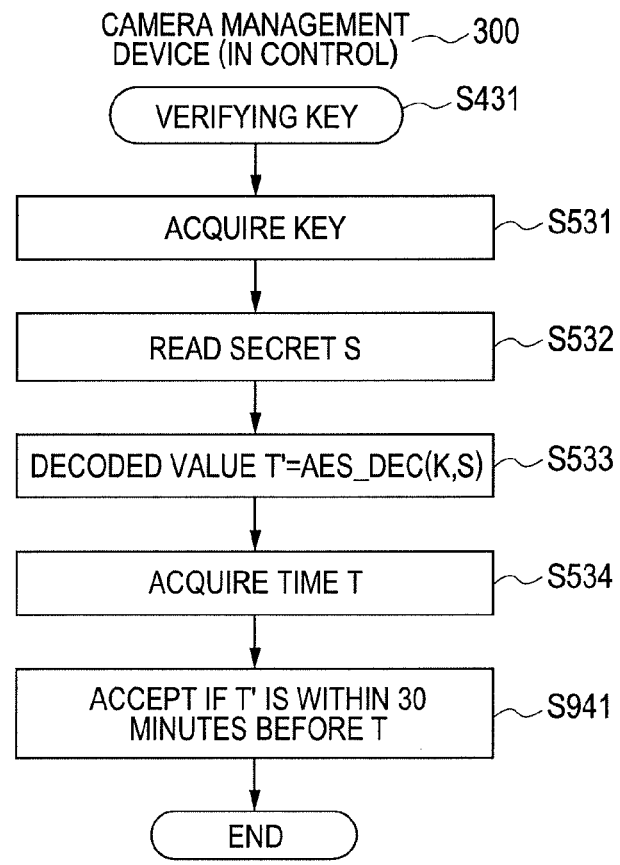

FIGS. 12A and 12B are flowcharts showing the key generating process and a key verifying process respectively executed by the authenticating unit 206 in this embodiment. First, the key generating process for generating the key 115 in the step S421 will be described. The camera management device 300 reads stored secret information 114 (hereinafter called a secret S) (114) (S521), reads time T from a timer clock (S522), encrypts according to AES using the time T for a plaintext and using the secret S (114) for a key, and generates its result as the key 115 (S523).

———Key Verification (S431-1)———

Next, the key verifying process for verifying the key 115 in the step S431 will be described.

The camera management device 300 acquires the key 115 extracted from the camera image 116 (S531), reads a stored secret S (114) (S532), decrypts according to AES using the key 115 for a cipher text and using the secret S as a key and acquires its result T' (S533), reads time T from the timer clock (S534), and accepts the result if T' and T meet the fixed condition (S941). The camera management device rejects the result when they do not meet the fixed condition. The fixed condition is that T' is within 30 minutes before T for example. Hereby, the camera management device accepts the result if it is within 30 minutes after the camera management device 3003 generates the key 115 and before the camera management device 3003 verifies the key 115.

As described above, the network camera 400 can be controlled by the control medium 210 that displays the image object information 111 including the control information 110.

———Hardware Configuration of Camera Management Device 300———

Figure 14:
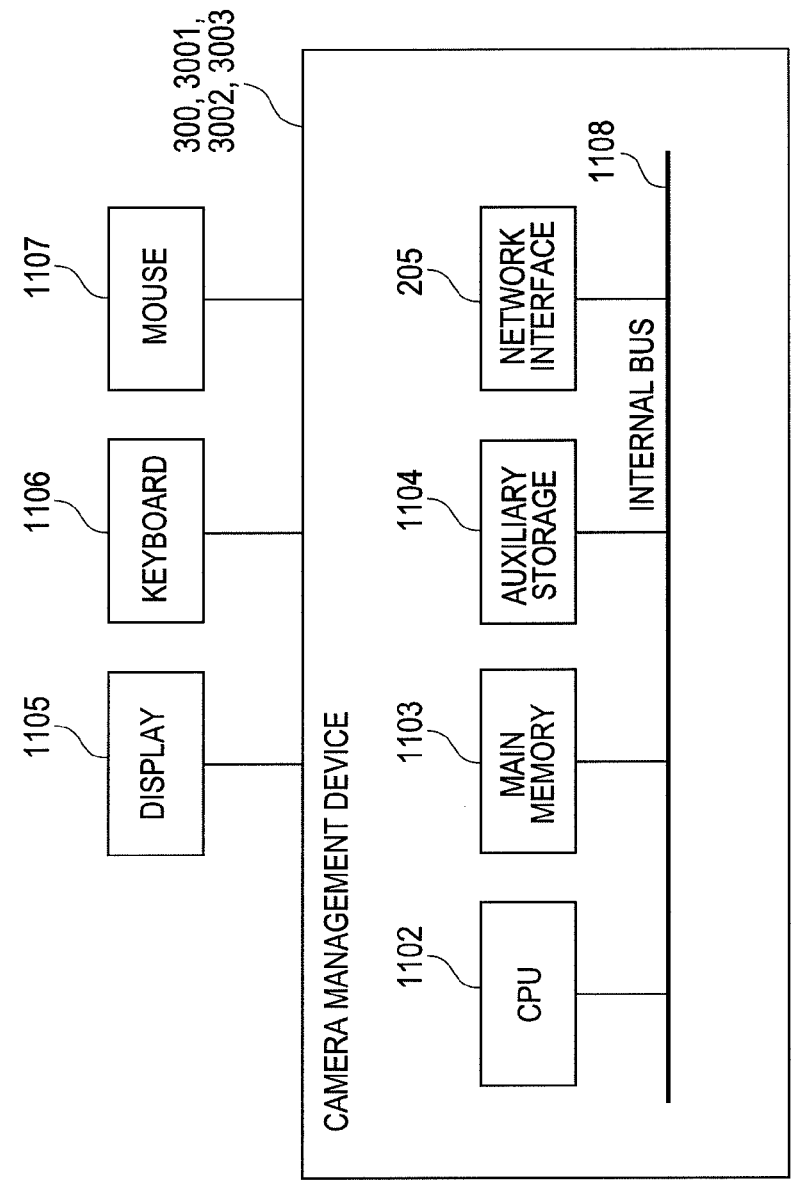
FIG. 14 shows the hardware configuration of a camera management device in this embodiment.

FIG. 14 shows the hardware configuration of the camera management devices 300, 3001, 3002 and 3003 in the above-mentioned first to sixth embodiments.

The camera management device 300 includes a central processing unit (CPU) 1102, a main memory 1103 which is a high speed volatile storage that temporarily stores a program operated in the CPU 1102, an auxiliary storage 1104 which is a nonvolatile storage that stores a program and data operated in the CPU 1102, the network interface 205 coupled to the network 101, a display 1105 that displays the image object information 111 received from the network camera 400 and a user interface, a keyboard 1106 for inputting operation and a mouse 1107. Functions with which the camera management device 300 is provided are realized as programs operated in the CPU and execute the above-mentioned various processing.

The embodiments of the present invention have been concretely described. However, the present invention is not limited to them, and various changes are allowed in a range that does not deviate from its object.

For example, in the above-mentioned embodiments, the camera management device 300 generates the control command according to the control information 110 by analyzing the control information 110 included in the image object information 111 projected by the network camera 400 and controls the network camera 400. However, in place of the network camera 400, a device that projects an image such as a scanner, a copying machine, a multifunctional printer and a digital camera can also be applied.

Further, the above-mentioned method may also be used not only for the network camera system but for projecting image object information 111 using a camera installed at ATM and instructing to operate an ATM terminal according to control information 110 included in the image. Besides, image object information 111 is projected by a camera equipped in an elevator and the elevator can also be operated for maintenance and others according to control information 110 included in the image.

What is claimed is:

1. A camera management device coupled to a network camera via a network, comprising:
   an image receiving unit that receives image data projected by the network camera and including control information for controlling the network camera from the network camera;
   a control information extracting unit that extracts the control information from the image data received by the image receiving unit;

a mode storage that stores a state of a control mode which is a mode for controlling the operation of the camera management device;

a control transmitting unit that transmits a control command according to the control information to the network camera via the network when the control mode is on;

an upper limit frequency storage that records an upper limit frequency by which the control command is transmitted;

a frequency storage that stores a frequency by which the control command is transmitted after the control mode is turned on; and an authenticating unit determines whether or not a frequency by which the control command is transmitted exceeds the upper limit frequency and turns off the control mode when the authenticating unit determines that the frequency by which the control command is transmitted exceeds the upper limit frequency.

2. The camera management device according to claim 1, wherein the control transmitting unit transmits the control command for ringing a sound to the network camera when the control transmitting unit transmits the control command to the network camera.

3. A network camera system in which a network camera and a camera management device that manages the network camera are coupled via a network, wherein the camera management device is provided with:

an image receiving unit that receives image data projected by the network camera and including control information for controlling the network camera from the network camera;

a control information extracting unit that extracts the control information from the image data received by the image receiving unit;

a mode storage that stores a state of a control mode which is a mode for controlling the operation of the camera management device;

a control transmitting unit that transmits a control command according to the control information to the network camera via the network when the control mode is on;

an upper limit frequency storage that records an upper limit frequency by which the control command is transmitted;

a frequency storage that stores a frequency by which the control command is transmitted after the control mode is turned on;

an authenticating unit determines whether or not a frequency by which the control command is transmitted exceeds the upper limit frequency and turns off the control mode when the authenticating unit determines that the frequency by which the control command is transmitted exceeds the upper limit frequency; and the network camera is provided with:

a projecting unit that projects a device for displaying image object information which includes the control information and which is information to be projected;

an image distributing unit that transmits the image object information projected by the projecting unit to the camera management device as the image data;

a control receiving unit that receives the control command from the camera management device; and a controlled unit that controls the network camera according to the control command received by the control receiving unit.

4. The network camera system according to claim 3 wherein in the network camera, the projecting unit projects image object information including the control information printed on a predetermined medium.

5. A camera management device coupled to a network camera via a network, comprising:

an image receiving unit that receives image data that includes key information for verifying whether or not a device for displaying control information projected by the network camera for controlling the network camera and image object information projected by the network camera which is information to be projected by the network camera is a legal device from the network camera;

a control information extracting unit that extracts the control information and the key information from the image data received by the image receiving unit;

an authenticating unit that verifies whether or not the device is a legal device based on the key information; and a control transmitting unit that transmits the control command to the network camera via the network when the verification succeeds by the authenticating unit.

* * * * *